(12) United States Patent
Shan et al.

(10) Patent No.: US 11,009,780 B2
(45) Date of Patent: May 18, 2021

(54) SELFIE DEVICE

(71) Applicant: WINNERS' SUN PLASTIC & ELECTRONIC (SHENZHEN) CO., LTD., Shenzhen (CN)

(72) Inventors: Jinghua Shan, Shenzhen (CN); Yi Bing Peng, Shenzhen (CN)

(73) Assignee: WINNERS' SUN PLASTIC & ELECTRONIC (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/716,526

(22) Filed: Dec. 17, 2019

(65) Prior Publication Data

US 2020/0371410 A1 Nov. 26, 2020

(30) Foreign Application Priority Data

May 21, 2019 (CN) .......................... 201920732019.3

(51) Int. Cl.
*G03B 17/38* (2021.01)
*G03B 17/56* (2021.01)
*F16M 13/04* (2006.01)
*F16M 11/24* (2006.01)
*F16M 11/28* (2006.01)

(52) U.S. Cl.
CPC ........... *G03B 17/38* (2013.01); *F16M 11/242* (2013.01); *F16M 11/28* (2013.01); *F16M 13/04* (2013.01); *G03B 17/561* (2013.01)

(58) Field of Classification Search
CPC .... G03B 17/38; G03B 17/561; F16M 11/242; F16M 11/28; F16M 13/04
See application file for complete search history.

(56) References Cited

U.S. PATENT DOCUMENTS

2016/0297062 A1* 10/2016 Huang ................... F16M 11/14

* cited by examiner

*Primary Examiner* — Minh Q Phan

(57) ABSTRACT

A selfie device, including a clamping mechanism configured to clamp a mobile phone, a telescopic rod, a handle sleeved on an outside of the telescopic rod, and a wireless remote. The clamping mechanism includes an upper clamping part, a lower clamping part and an elasticity stretching part providing a restoring force for the upper clamping part. The elasticity stretching part are respectively connected with the upper clamping part and the lower clamping part. The lower clamping part is arranged on a top end of the telescopic rod. An accommodating cavity for accommodating the wireless remote is arranged inside the handle.

15 Claims, 7 Drawing Sheets

SELFIE DEVICE

TECHNICAL FIELD

The present disclosure relates to a field of selfie equipment, and in particular to a selfie device.

BACKGROUND

At present, selfie sticks are widely used for mobile phone selfies. The selfie sticks can arbitrary elongate and shorten within a specific length range. A user only needs to fix a camera and the mobile phone on a telescopic rod of the selfie stick, such that a multi-angle selfie is realized by a remote. Most conventional selfie sticks control selfies by a button on a handle. Or some of the conventional selfie sticks are controlled by a wireless remote to realize a long-distance selfie control. In general, the wireless remote is arranged on a slide of the handle, which looks awkward and seriously affects an overall appearance of the selfie sticks. Therefore, improvement and development of the selfie sticks of the prior art are still needed.

SUMMARY

In order to solve deficiency of the prior art, the present disclosure provides a selfie device with a clean appearance and user-friendly.

A technical scheme of the present disclosure to solve the deficiency of the prior art is as follows: the present disclosure provides the selfie device, including a clamping mechanism configured to clamp mobile phone, a telescopic rod, a handle sleeved on an outside of the telescopic rod, and a wireless remote. The clamping mechanism comprises an upper clamping part, a lower clamping part, and an elasticity stretching part providing a restoring force for the upper clamping part. The elasticity stretching part is connected to the both the upper clamping part and the lower clamping part. The lower clamping part is arranged on a top end of the telescopic rod. An accommodating cavity for accommodating the wireless remote is arranged inside the handle. The wireless remote is detachably sandwiched between the upper clamping part and the lower clamping part. The lower clamping part, the elasticity stretching part, and the wireless remote is accommodated in the accommodating cavity through folding the telescopic rod.

Furthermore, the lower clamping part is arranged on the top end of the telescopic rod by a connecting plate. A bottom end of the connecting plate is rotatably arranged on the top end of the telescopic rod. The elasticity stretching part is rotatably arranged on the connecting plate.

Furthermore, the connecting plate is rotatably arranged on the top end of the telescopic rod by a first shaft. The elasticity stretching part is rotatably arranged on the connection plate by a second shaft. The first shaft is perpendicular to the second shaft.

Furthermore, the selfie device future comprises three support sticks for supporting. The three support sticks are rotatably arranged on the handle. The three support sticks enclose to form an accommodating space to accommodate the telescopic rod after folding.

Furthermore, the selfie device future comprises three legs and a connecting ring. The three legs are arranged inside the handle and can extend from a bottom surface of the handle. The three legs are rotatably arranged on the connecting ring. The connecting ring is sleeved on the outside of the telescopic rod and slid along a shaft direction of the telescopic rod. When the three legs support the selfie device, the bottom surface of the handle abuts against the three legs.

Furthermore, a mounting block is disposed on the bottom of the handle, a button is disposed on the mounting block. Three card pins are disposed on the button. A card slot is arranged on a bottom end of each of the leg. The card slots are matched with the card pins. When the three legs are arranged inside the handle, the card pins are engaged with the card slots.

Furthermore, the wireless remote comprises a shell; a battery, a circuit board, and a magnet are arranged inside the shell. A selfie button is arranged on the shell. The selfie button and the battery are electrically connected with the circuit board respectively.

Furthermore, the outer shell comprises an upper shell and a lower shell, the upper shell is matched with the lower shell. A first groove accommodating the battery is disposed on the lower shell.

Furthermore, the lower shell further comprises a second groove accommodating a magnet.

Furthermore, a surface of the outer shell contacting the handle is of a circular arc shape, a radian of the circular arc shape is matched with a radian of a surface of the handle.

Compare to the prior art, the present disclosure provides a selfie device, where the handle has the accommodating cavity to accommodate the wireless remote. When the wireless remote is not needed, the wireless remote is sandwiched between the upper clamping part and the lower clamping part. The lower clamping part, the elasticity stretching part, and then the wireless remote are accommodated in the accommodating cavity through folding the telescopic rod. The wireless remote is arranged inside the handle rather than being arranged on a side of the handle, such that the selfie stick reduces its own radial size, greatly improving cleanliness of the selfie device, and making the selfie device to be easy to use and carry.

BRIEF DESCRIPTION OF DRAWINGS

The present disclosure will be further described below in conjunction with the accompanying drawings and embodiments, in the figures.

DETAILED DESCRIPTION

Preferred embodiments of the present disclosure will be further described in the following with reference to the drawings.

Figure 1:
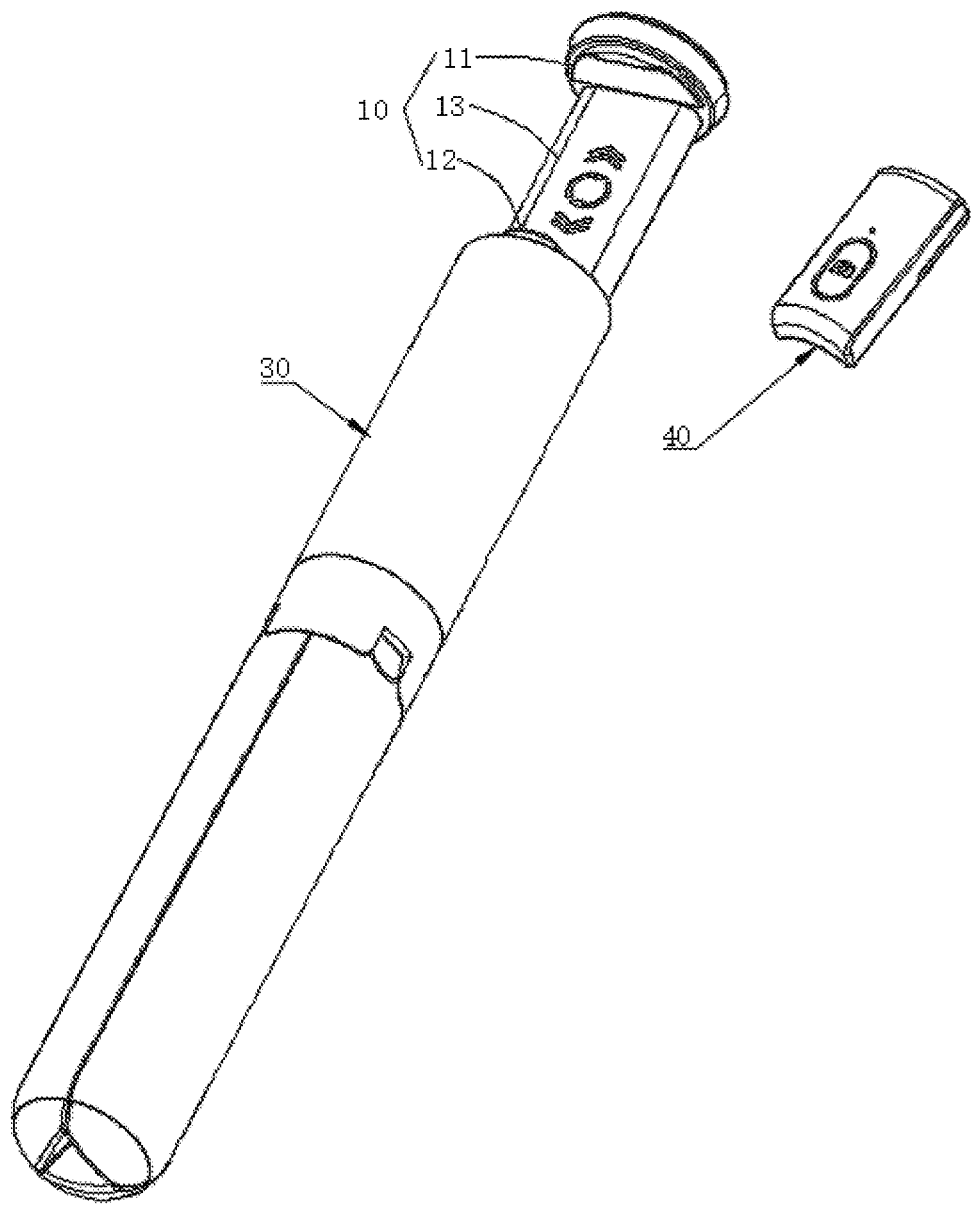
FIG. 1 is a stereogram of a selfie device of an embodiment of the present disclosure.
Figure 2:
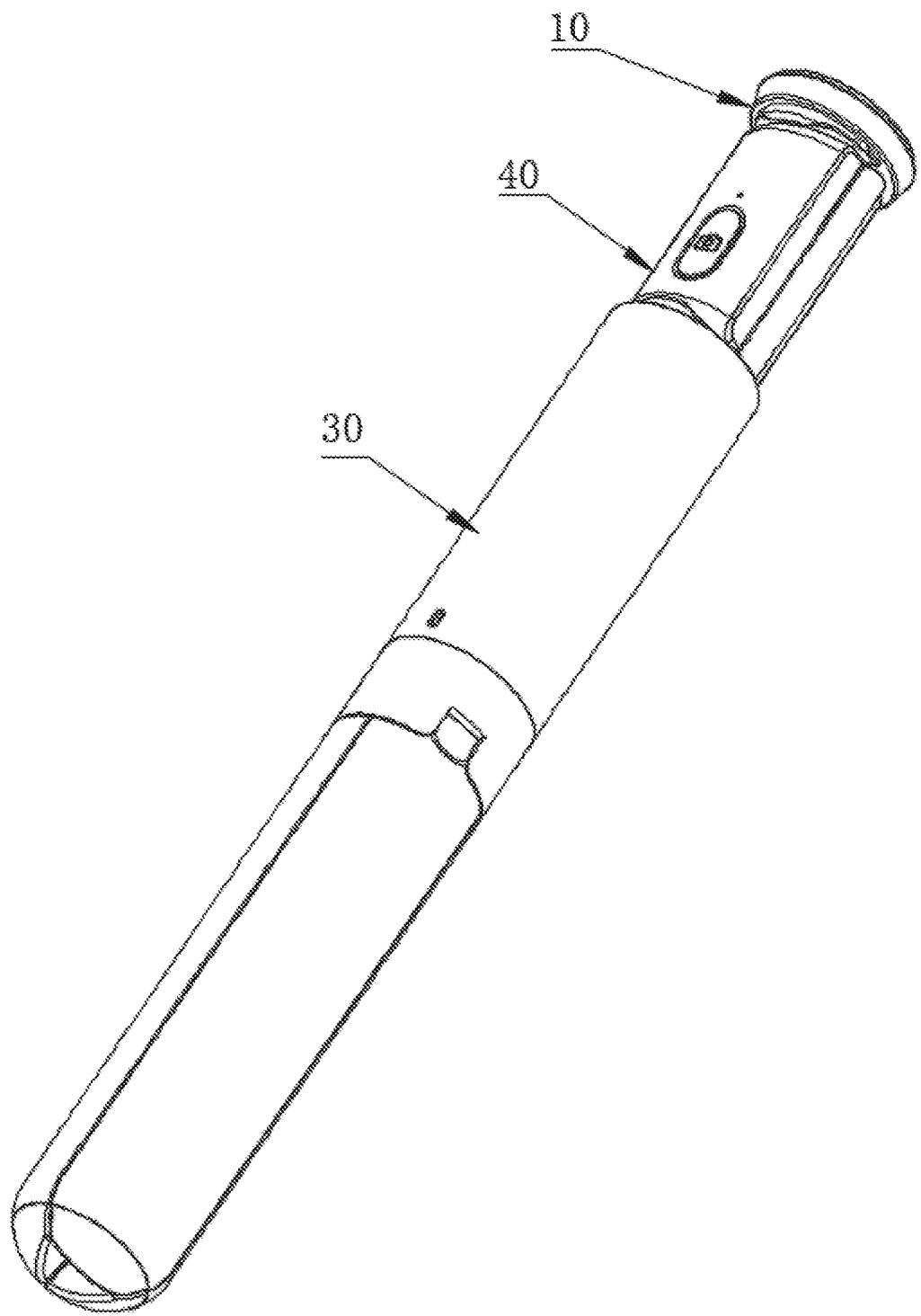
FIG. 2 is a perspective view of a wireless remote of FIG. 1 sandwiched in a clamping mechanism.
Figure 3:
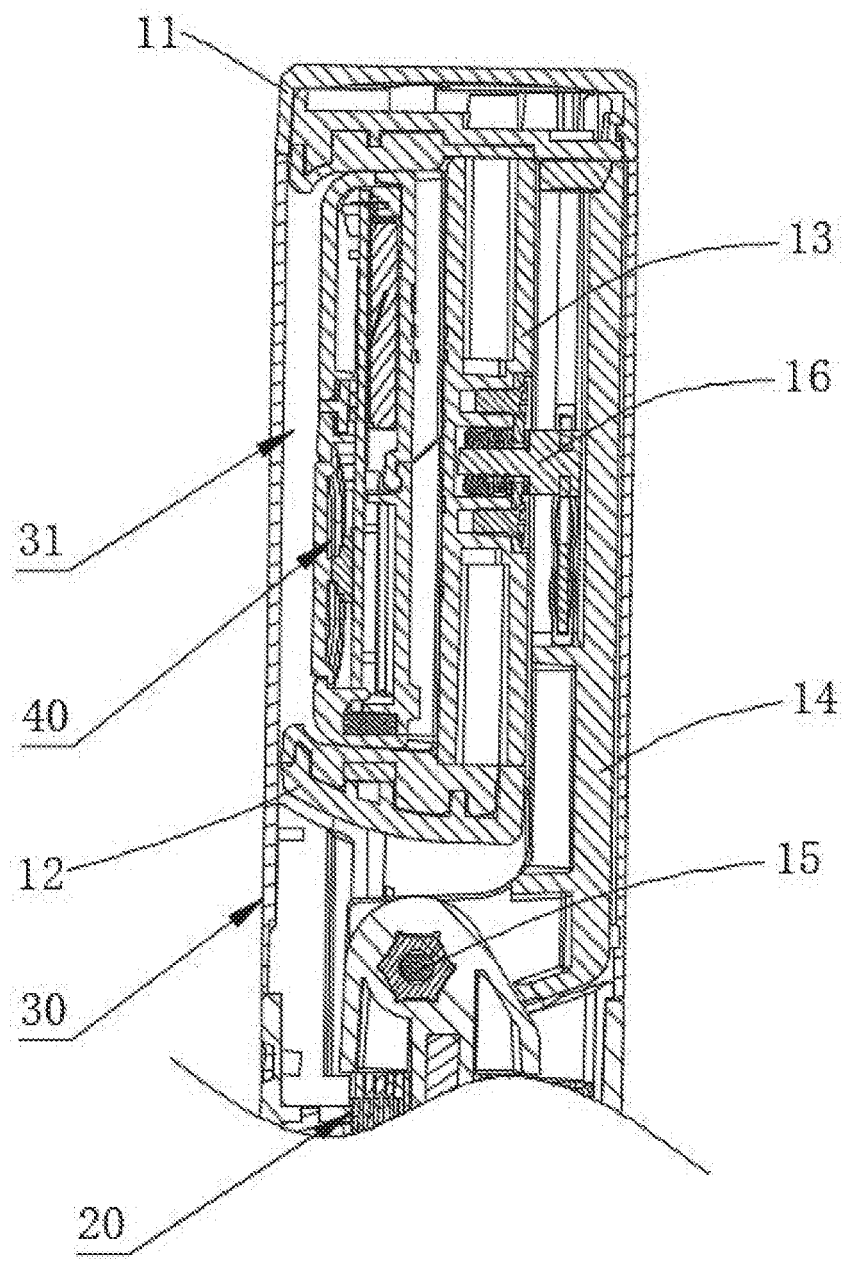
FIG. 3 is a cross-sectional view that shows the wireless remote accommodated inside a handle.

As shown in FIG. 1 to FIG. 3, the present disclosure provides a selfie device comprises a clamping mechanism 10, a telescopic rod 20, a handle 30 sleeved on outside of the telescopic rod 20, and a wireless remote 40. The clamping mechanism 10 comprises an upper clamping part 11, a lower clamping part 12 and an elasticity stretching part 13 providing a restoring force for the upper clamping part 11. The elasticity stretching part 13 is connected to both the upper clamping part 11 and the lower clamping part 12. The lower clamping part 12 is arranged on a top end of the telescopic rod 20. An accommodating cavity 31 for accommodating the wireless remote 40 is arranged inside the handle 30. The wireless remote 40 is detachably sandwiched between the upper clamping part 11 and the lower clamping part 12, The lower clamping part 12, the elasticity stretching part 13, and the wireless remote 40 are accommodated in the accommodating cavity 31 through folding the telescopic rod 20.

Since the handle 30 has the accommodating cavity 31 accommodating the wireless remote 40. When the wireless remote 40 is not needed, the wireless remote 40 is sandwiched between the upper clamping part 11 and the lower clamping part 12. The lower clamping part 12, the elasticity stretching part 13, and the wireless remote 40 are accommodated in the accommodating cavity 31 through folding the telescopic rod 20. The wireless remote 40 is arranged inside the handle 30 rather than being arranged on a side of the handle 30, such that the selfie stick reduces its own radial size, greatly improving cleanliness of the selfie device, and making the selfie device to be easy to use and carry.

In the present embodiment, non-slip soft rubber pads are arranged on the upper clamping part 11 and the lower clamping arm 12. The elasticity stretching part 13 is a guide rod and spring cooperative structure and support arm structure etc.

Figure 4:
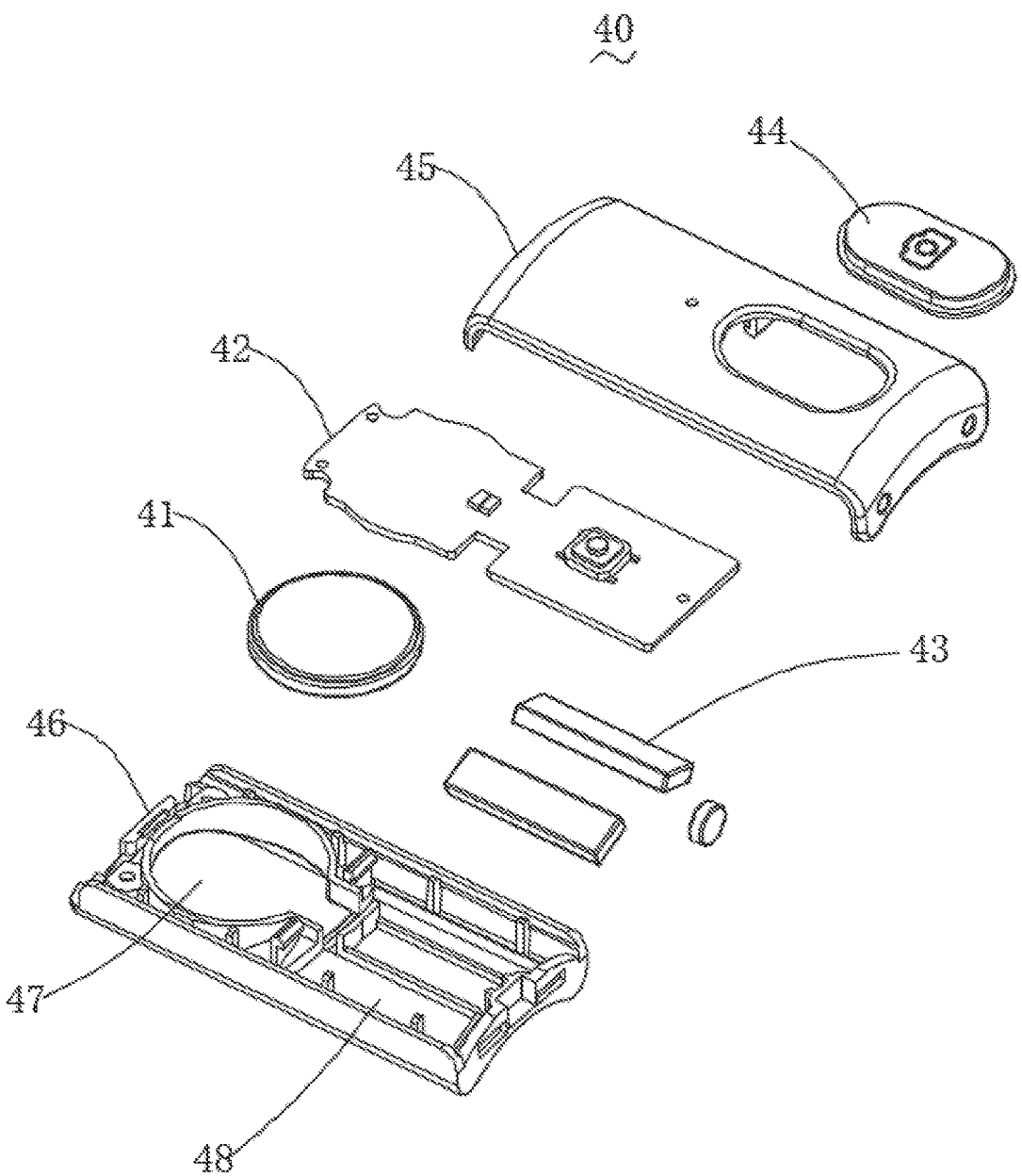
FIG. 4 is an exploded view of the wireless remote of FIG. 1.

As shown in FIG. 4, the wireless remote 40 comprises a shell. A battery 41, a circuit board 42, and a magnet 43 are arranged inside the shell. A selfie button 44 is arranged on the shell. The selfie button 44 and the battery 41 are electrically connected with the circuit board respectively. Certainly, a BLUETOOTH module can be further arranged on the circuit board 42. When the BLUETOOTH module is connected with the mobile phone, a mobile phone selfie is realized by the selfie button 44.

To be specific, the outer shell comprises an upper shell 45 and a lower shell 46, and the upper shell 45 is matched with the lower shell 46. A first groove 47 accommodating the battery 41 is disposed on the lower shell 46. The lower shell 46 further comprises a second groove 48 accommodating a magnet 43. The wireless remote 40 is attached to the handle 30 by the magnet 43, which is easy to use. Certainly, the wireless remote 40 can carry by hand to realize the long-distance selfie.

Figure 5:
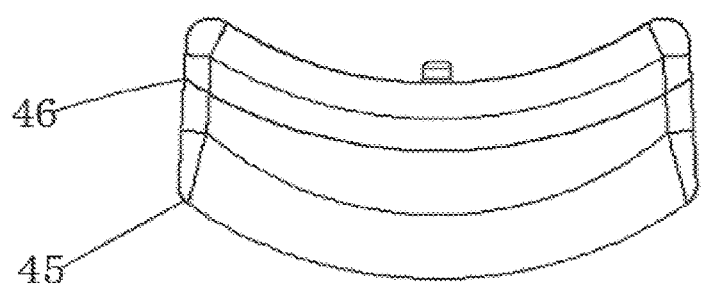
FIG. 5 is a top plan view of the wireless remote of FIG. 1.
Figure 6:
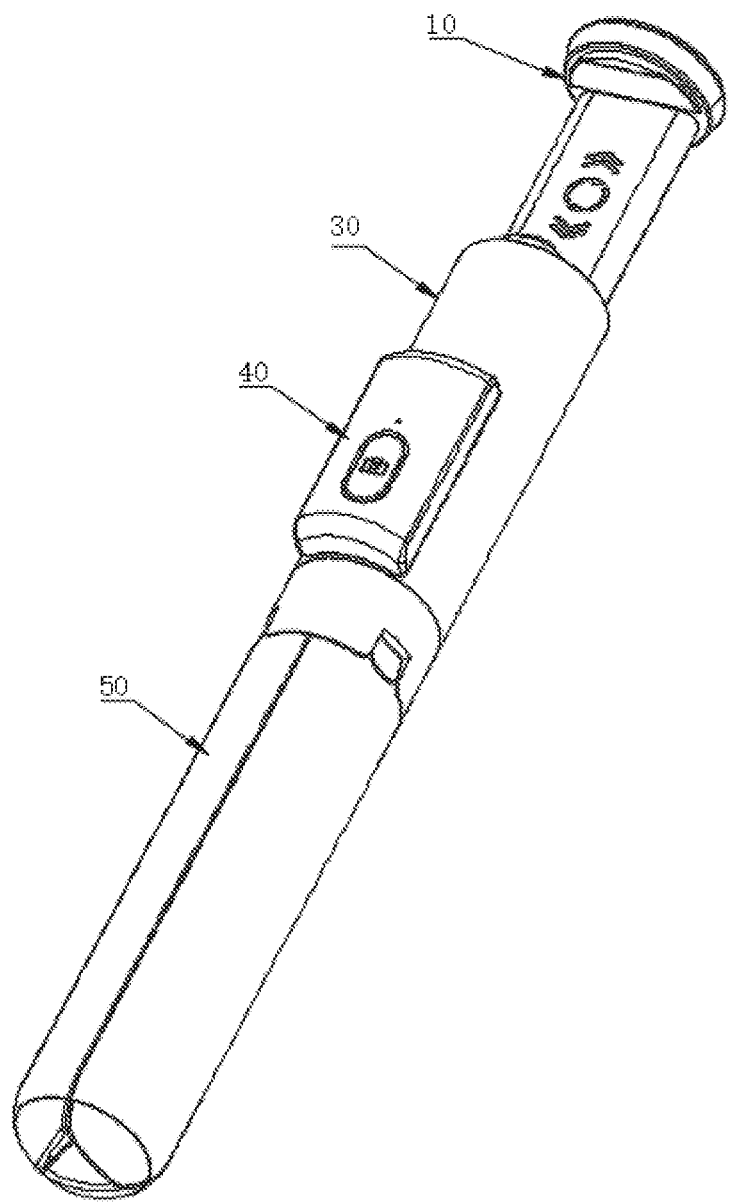
FIG. 6 is a structural schematic diagram illustrating the wireless remote attached to a side of the handle of the FIG. 1.

As shown in FIG. 5, in order to stable the coordinate between the wireless remote 40 and the handle 30, a surface of the outer shell contacting the handle is of a circular arc shape, a radian of the circular arc shape is matched with a radian of a surface of the handle 30. As shown in FIG. 6, when the wireless remote is used, the telescopic rods 20 are stretched to make the wireless remote 40 out of the handle 30. Then, the wireless remote 40 is taken out between the upper clamping part 11 and the lower clamping part 12. Finally, the magnet 43 is mutually attached with a magnet inside the handle 30, so that the wireless remote is attached on the handle 30. At this time, the way of use of the present disclosure is the same as normal selfie sticks. The handle 30 is held by hand. The selfie is realized by press the selfie button 44. The handle 30 is a cylindrical shape.

In the present embodiment, the lower clamping part 12 is arranged on the top end of the telescopic rod 20 by a connecting plate 14. A bottom end of the connecting plate 14 is rotatably arranged on the top end of the telescopic rod 20. The elasticity stretching part 13 is rotatably arranged on the connecting plate 14 (refer to FIG. 3). To be specific, the connecting plate 14 is rotatably arranged on the top end of the telescopic rod 20 by a first shaft 15. The elasticity stretching part 13 is rotatably arranged on the connection plate 14 by a second shaft 16. The first shaft 15 is perpendicular to the second shaft 16. When the mobile phone is clamped between the upper clamping part 11 and the lower clamping part 12. The elasticity stretching part 13 rotated around the second shaft 16 by an external force, such that a screen of the mobile phone change between a horizontal screen and a vertical is realized and the selfie device is easy to use. The clamping mechanism 10 rotates around the first shaft 15 and the second shaft 16, thus, a purpose of adjusting a selfie angle is realized and a selfie effect is greatly improved.

In other embodiments, a structure of the clamping mechanism 10 is able to be other structures that applicable.

In the present embodiment, the selfie device comprises three support sticks 50 for supporting. The three support sticks 50 are rotatably arranged on the handle 30. The three support sticks 50 enclose to form an accommodating space to accommodate the telescopic rod 20 after folding.

Figure 7:
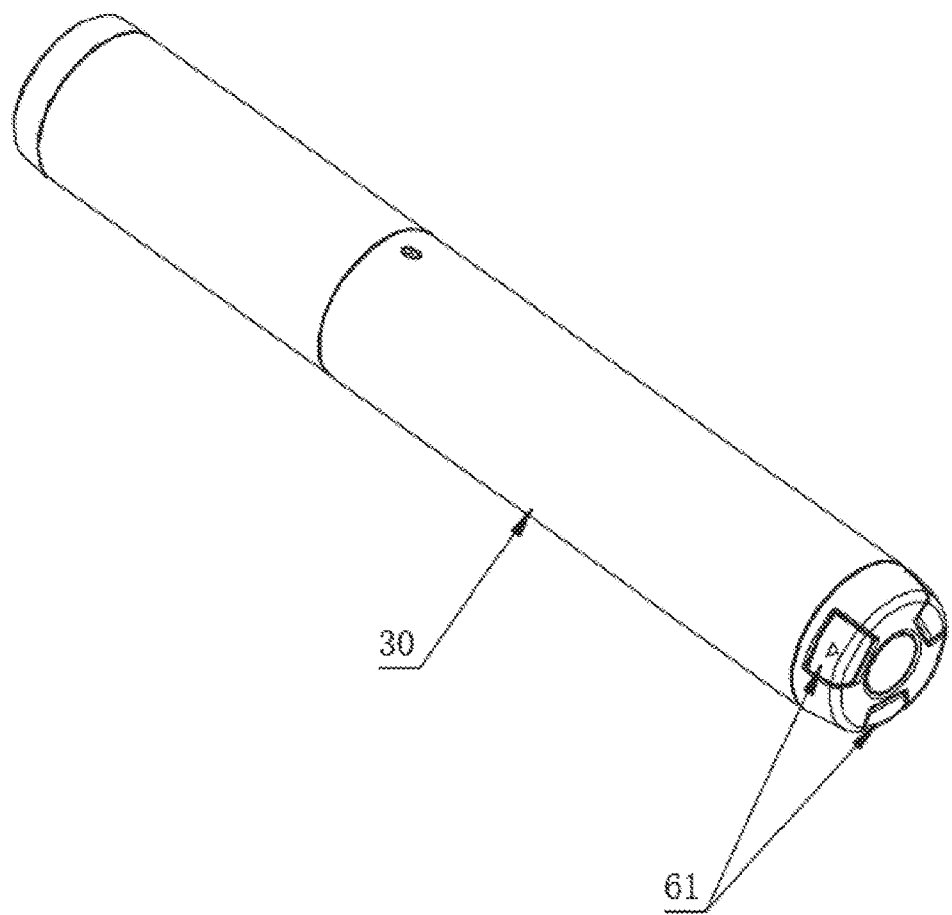
FIG. 7 is a three-dimensional schematic view of a selfie device of another embodiment of the present disclosure.
Figure 8:
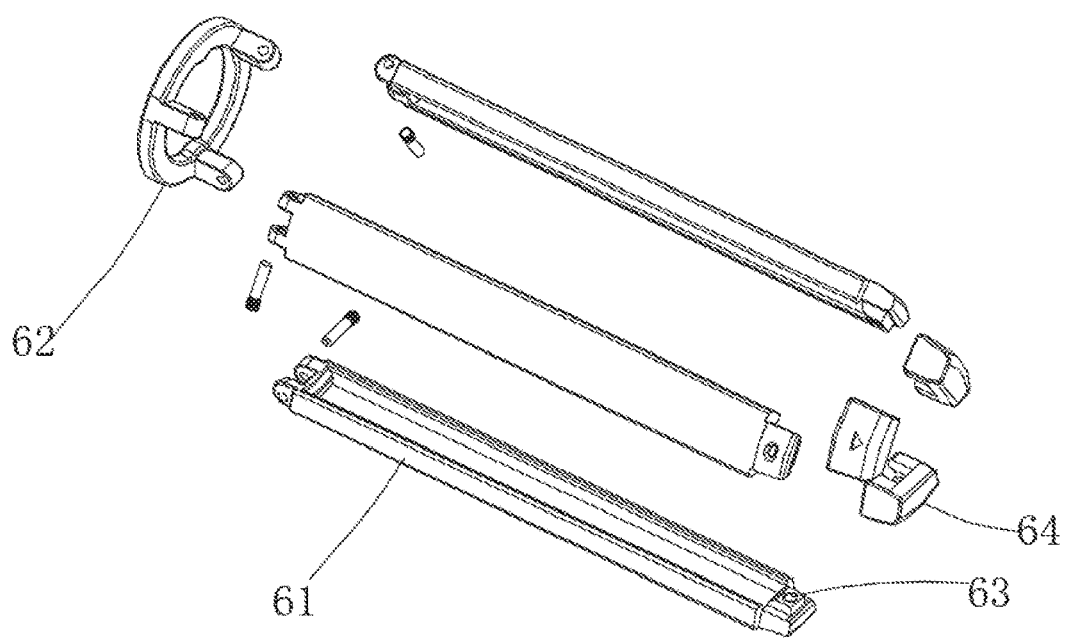
FIG. 8 is an exploded view of legs of the FIG. 7.

In other embodiments, as shown in FIG. 7 and FIG. 8, the selfie device comprises three legs 61 and a connecting ring 62. The three legs 61 are arranged inside the handle 30 and are able to extend from a bottom surface of the handle 30. The three legs 61 are rotatably arranged on the connecting ring 62. The connecting ring 62 is sleeved on the outside of the telescopic rod 20 and slid along a shaft direction of the telescopic rod 20. When the three legs 61 support the selfie device, the bottom surface of the handle 30 abuts against the three legs 61 to support.

Figure 9:
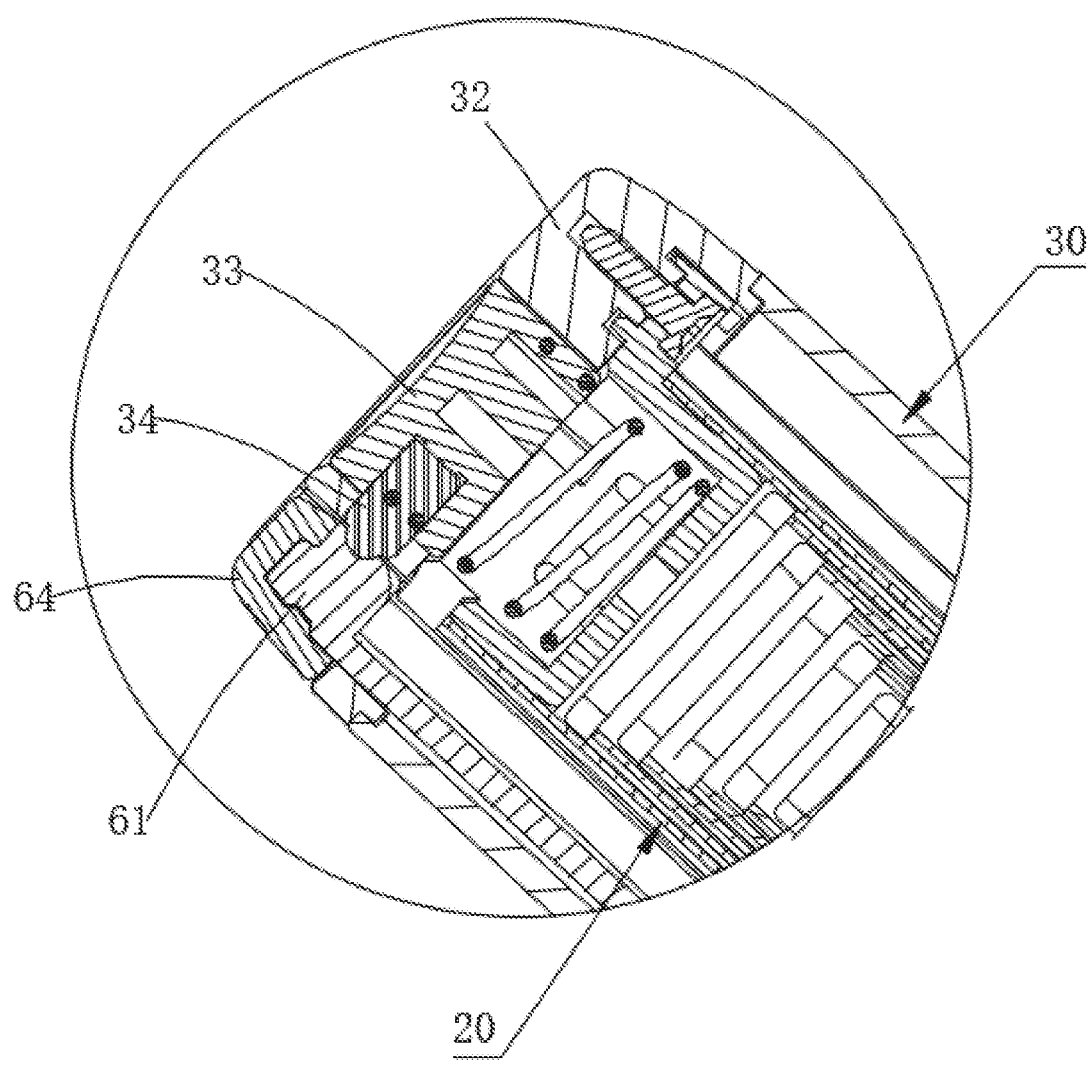
FIG. 9 is a sectional view of a bottom of the handle of the FIG. 7.

As shown in FIG. 8 and FIG. 9, a mounting block 32 is disposed on the bottom of the handle 30. A button 33 is disposed on the mounting block 32. Three card pins 34 are disposed on the button 33. A card slot 63 is arranged on a bottom end of each of the legs 61. The card slots 63 are matched with the card pins 34. When the three legs 61 are arranged inside the handle 30, the card pins 34 are engaged with the card slots 63. A position of the three legs 61 is realized to avoid the arbitrary slide of the three legs 61. In addition, in order to enhance the stability of the support, non-slip soft rubber pads 64 are arranged on a bottom end of each leg 61.

It should be understood, the embodiments above are only used to illustrate the technical solutions of the present disclosure, and not for limitation thereto. The person skilled in the art can modify the technical solutions recorded in the embodiments or replace parts of the technical features equivalently. But any modifications and equivalent substitutions are intended to be made within the protective scope of the appended claims of the present disclosure.

The invention claimed is:

1. A selfie device, comprising:
a clamping mechanism configured to clamp a mobile phone,
a telescopic rod,
a handle sleeved on an outside of the telescopic rod, and
a wireless remote;
wherein the clamping mechanism comprises an upper clamping part, a lower clamping part, and an elasticity stretching part providing a restoring force for the upper clamping part; the elasticity stretching part is connected to both the upper clamping part and the lower clamping part; the lower clamping part is arranged on a top end of the telescopic rod; wherein an accommodating cavity for accommodating the wireless remote is arranged inside the handle; the wireless remote is detachably sandwiched between the upper clamping part and the lower clamping part; the lower clamping part, the elasticity stretching part, and the wireless remote are accommodated in the accommodating cavity through folding of the telescopic rod.

2. The selfie device according to claim 1, wherein the lower clamping part is arranged on the top end of the telescopic rod by a connecting plate; a bottom end of the connecting plate is rotatably arranged on the top end of the telescopic rod; the elasticity stretching part is rotatably arranged on the connecting plate.

3. The selfie device according to claim 2, wherein the connecting plate is rotatably arranged on the top end of the telescopic rod by a first shaft; the elasticity stretching part is rotatably arranged on the connection plate by a second shaft; the first shaft is perpendicular to the second shaft.

4. The selfie device according to claim 1, wherein the selfie device comprises three support sticks for supporting; the three support sticks are rotatably arranged on the handle; the three support sticks enclose to form an accommodating space for accommodating the telescopic rod after folding.

5. The selfie device according to claim 1, wherein the selfie device comprises three legs and a connecting ring; the three legs are arranged inside the handle and are able to extend from a bottom surface of the handle; the three legs are rotatably arranged on the connecting ring; the connecting ring is sleeved on the outside of the telescopic rod and slid along a shaft direction of the telescopic rod; when the three legs support the selfie device, the bottom surface of the handle abuts against the three legs.

6. The selfie device according to claim 5, wherein a mounting block is disposed on the bottom of the handle, a button is disposed on the mounting block; three card pins are disposed on the button; a card slot is arranged on a bottom end of each of the leg; the card slots are matched with the card pins; when the three legs are arranged inside the handle, the card pins are engaged with the card slots.

7. The selfie device according to claim 1, wherein the wireless remote comprises a shell; a battery, a circuit board, and a magnet are arranged inside the shell; a selfie button is arranged on the shell; the selfie button and the battery are electrically connected with the circuit board respectively.

8. The selfie device according to claim 2, wherein the wireless remote comprises a shell; a battery, a circuit board, and a magnet are arranged inside the shell; a selfie button is arranged on the shell; the selfie button and the battery are electrically connected with the circuit board respectively.

9. The selfie device according to claim 3, wherein the wireless remote comprises a shell; a battery, a circuit board, and a magnet are arranged inside the shell; a selfie button is arranged on the shell; the selfie button and the battery are electrically connected with the circuit board respectively.

10. The selfie device according to claim 4, wherein the wireless remote comprises a shell; a battery, a circuit board, and a magnet are arranged inside the shell; a selfie button is arranged on the shell; the selfie button and the battery are electrically connected with the circuit board respectively.

11. The selfie device according to claim 5, wherein the wireless remote comprises a shell; a battery, a circuit board, and a magnet are arranged inside the shell; a selfie button is arranged on the shell; the selfie button and the battery are electrically connected with the circuit board respectively.

12. The selfie device according to claim 6, wherein the wireless remote comprises a shell; a battery, a circuit board, and a magnet are arranged inside the shell; a selfie button is arranged on the shell; the selfie button and the battery are electrically connected with the circuit board respectively.

13. The selfie device according to claim 7, wherein the shell comprises an upper shell and a lower shell, the upper shell is matched with the lower shell; a first groove accommodating the battery is disposed on the lower shell.

14. The selfie device according to claim 13, wherein the lower shell further comprises a second groove accommodating a magnet.

15. The selfie device according to claim 7, wherein a surface of the shell contacting the handle is of a circular arc shape, a radian of the circular arc shape is matched with a radian of a surface of the handle.

* * * * *